No. 723,100. PATENTED MAR. 17, 1903.
J. P. WHITE.
TRAP.
APPLICATION FILED JUNE 27, 1902.
NO MODEL.

Witnesses
Chas. K. Davies
E. E. Carrick

Inventor
James P. White
by Guelon B. Mock
Attorney

UNITED STATES PATENT OFFICE.

JAMES P. WHITE, OF MATTOON, ILLINOIS.

TRAP.

SPECIFICATION forming part of Letters Patent No. 723,100, dated March 17, 1903.

Application filed June 27, 1902. Serial No. 113,490. (No model.)

*To all whom it may concern:*

Be it known that I, JAMES P. WHITE, a citizen of the United States, and a resident of Mattoon, in the county of Coles and State of Illinois, have invented a new and useful Improvement in Traps, of which the following is a specification.

My invention relates to traps.

More particularly stated, the improvement is designed for animal-traps for mice and rats of the rodent family. It is, however, applicable for trapping animals of any kind in so far as it is applicable thereto.

For these purposes my invention consists in the following construction and combination of parts, the details of which will first be fully described and the points of novelty then set forth in the claim.

Figure 1:
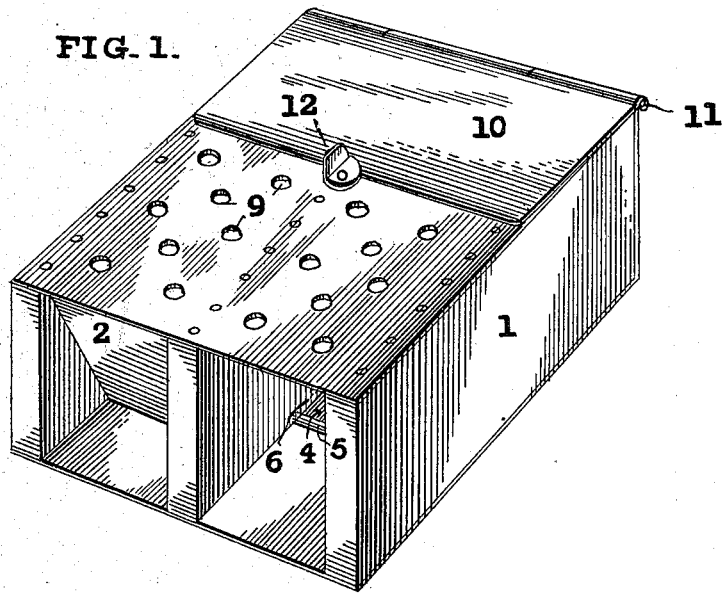
Figure 2:
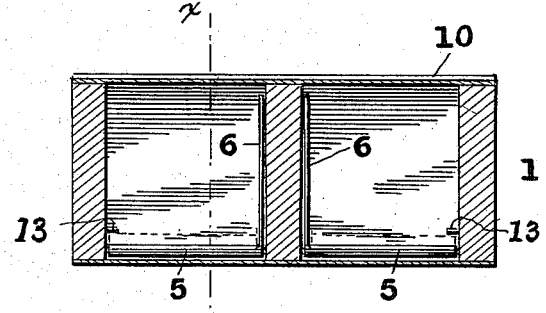
Figure 3:
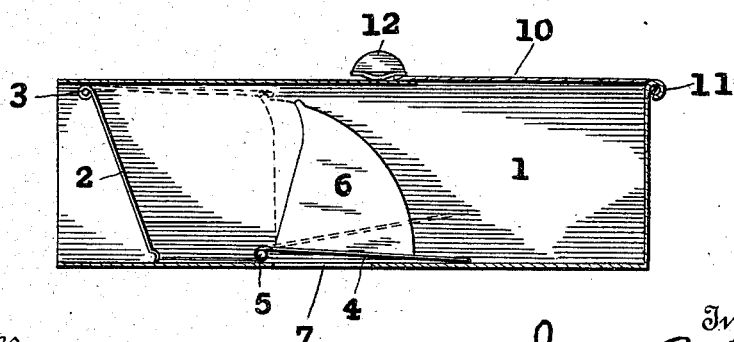

Figure 1 is a perspective view of a trap to which my invention has been applied. Fig. 2 is a transverse vertical section of the same. Fig. 3 is a longitudinal section at right angles to the point of section in Fig. 2, taken on the line *x x* of Fig. 2.

In the drawings, 1 represents a box-like structure having sides, bottom, top, and one end wall, the other end being open, so that access may be had thereto. This latter opening is provided with a gate 2, pivoted at the top to the side walls at 3 and arranged to open inwardly and upwardly against the top wall of the box. To the rear of the gate 2 is a pivoted latch-plate 4, having its pivotal point 5 in the neighborhood of a line drawn vertically from the free end of the gate 2 when the latter is at its upper horizontal position and its free end projecting toward the rear or interior of the box. Rigidly connected to this pivotal latch-plate 4 is a latch-arm 6, projecting from one side of the latch-plate 4, whereby when the plate 4 is slightly elevated the free end of the latch part 6 will project under the free end of the gate 2 and hold the said gate open.

For the purpose of conveniently manipulating the latch-plate 4 an opening 7 is made in the bottom of the box 1, whereby a finger may be introduced therein against the free end of the latch-plate and the latch 6 thrown into engagement with the door 2.

The hole 7 may be omitted, and the trap may be set by simply turning the box upside down, which act throws the doors downward by gravity against the top of the box in its reverse position, and the gravity of the free ends of the latch-plates 4 throws the locking-latch 6 over in contact with the free end of the door. The box is then righted to its original position, when the trap will be found to be set.

When the trap is inverted, the plate 4 swings until it strikes the stop 13, which movement is just sufficient to carry the catch on the latch-arm 6 beyond the catch upon the free end of the gate 2, the latter having been swung up against the top of the box in position to effect the latchment.

I may provide the upper side of the box 1 with perforations 9 or other equivalent modification for the purpose of properly ventilating the trap.

The rear part of the top of the trap 10 is pivoted at 11 and has a latch 12, whereby the top may be thrown up, permitting access to the inner end of the trap for the purpose of baiting the same or removing the animal caught therein.

While I have described my invention in connection with a single chamber, it will be understood that one or a series of chambers of like construction may be employed in the same box-like structure. In the drawings I have shown two compartments each provided with the mechanism hereinbefore described.

I wish it further understood that I may vary the details of my construction and adapt any well-known equivalents therefor which come within the scope of my claim.

What I claim as new, and desire to secure by Letters Patent, is—

In an animal-trap, the combination of a box-like structure having one open side, a gate pivoted at the top and across said opening adapted to swing upwardly against the top of the box and to fall by gravity, a latch-plate pivoted to the box at an intermediate point near the bottom thereof, a stop for limiting the movement of the latch-plate, a latch secured to the latch-plate and adapted to engage the free end of the gate when the latch-plate is swung from the floor of the trap to the limit of movement defined by the stop.

In testimony whereof I have affixed my signature in the presence of two witnesses.

JAMES P. WHITE.

Witnesses:
F. N. HENLEY,
FRANK OHME.